Nov. 6, 1928. 1,690,190

E. ERICKSON

LIP TURNING MACHINE

Filed May 2, 1925  3 Sheets-Sheet 1

Nov. 6, 1928.

E. ERICKSON 1,690,190

LIP TURNING MACHINE

Filed May 2, 1925     3 Sheets-Sheet 2

Nov. 6, 1928.

E. ERICKSON

LIP TURNING MACHINE

Filed May 2, 1925  3 Sheets-Sheet 3

1,690,190

INVENTOR-
Edward Erickson
By his Attorney,
Nelson N. Howard

Patented Nov. 6, 1928.

1,690,190

UNITED STATES PATENT OFFICE.

EDWARD ERICKSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

LIP-TURNING MACHINE.

Application filed May 2, 1925. Serial No. 27,515.

This invention relates to improvements in lip turning machines and is herein shown as embodied in a machine for raising the lip or channel flap of an outsole for a McKay sewed shoe and turning the lip or flap over against the tread face of the sole. Certain features of the invention, however, are not limited to operation upon soles of this particular type but are capable of embodiment in a machine for operating upon other kinds of soles.

In the manufacture of a McKay sewed shoe the outsole is channeled along the margin of its tread face and subsequently the channel is opened to receive the stitches or other fastening devices which are to secure the sole to the shoe. Usually the channel is opened by means such as a plow which is arranged to raise the channel lip or flap into substantially perpendicular relation to the sole and, following the action of the plow, a lip turning device usually functions to turn the raised lip over toward or against the face of the sole the more effectively to expose the stitch-receiving groove commonly provided at the base of the lip.

In machines for turning the lips of McKay soles reliable work feeding means should be provided capable of advancing the work positively and rapidly without danger of marring the marginal surface at the unlipped side of the sole which is often exposed in the finished shoe, and without digging into the stock or otherwise injuring it as by undue frictional contact therewith. The sole, however, should be free to be swung readily while it is being fed so that the field of operations of the lip turning means will proceed properly along the curved portions of the sole margin. It is desirable also to provide feeding means which will not have any tendency to throw out the sole but which, in and of itself will tend to maintain the sole with its lip properly located transversely with respect to the lip turning means so that the operator may be relieved of the necessity of constantly holding the sole manually against an edge gage. Furthermore, in some styles of McKay shoes the sole is molded before the channel flap is turned. Some molded soles, such for example as those having the so-called cottage-roof shanks, are curved both longitudinally and transversely throughout the length of their shank portions and there is a more or less abrupt bend at the junction of the shank and the forepart. In operating upon molded soles of this general type it is of great importance to avoid distorting or breaking down the molded contour of the shank, and particularly to avoid flattening out the sharp bend between the shank and the forepart.

In view of the foregoing, one feature of this invention consists in the provision of a lip turning machine having improved work feeding means comprising a work supporting roll arranged to engage the lipped face of a sole outside of the lip and to bear against the shoulder of the lip, and a second feed roll rotatable about an axis parallel to the axis of the first roll for engaging the margin of the unlipped face of the sole, said rolls being constructed and arranged to support the portion of the sole engaged thereby in a plane oblique to the axes of the rolls. As illustrated the work supporting feed roll is made of very small diameter to enable it to enter the sharp angle between the shank and forepart of a molded sole of the cottage-roof shank type. The periphery of said roll is beveled to facilitate operation upon molded soles of this type by enabling the sharply bent portion between the forepart and the shank to pass over the roll without danger of being mutilated by the action of the roll. The upper feed disk is also made of small diameter and as shown is arranged with its axis parallel to the axis of the beveled work supporting roll. As a result of this arrangement the upper feed disk is disposed obliquely with respect to the face of a sole which is being fed thereby, the disk being tilted upwardly and outwardly from its point of contact with the sole and the sole is enabled to be swung more or less sharply, as the marginal portions at the ball and at the toe are being operated upon, without danger of the sole being injured by the action of the feed disk. The construction and arrangement of the co-operating feed rolls are further such that they grip the sole in a manner to offset any tendency of the sole to "throw out" or ride out from between the rolls, even when a thin edge shank is being operated upon.

Also as illustrated the upper feed disk is formed with a narrow, transversely rounded periphery which is adapted to enter and ride along the stitch-receiving groove of the sole or, if no stitch-receiving groove is provided, to enter the angle between the lip and the feather so as to bear against the base or shoulder of the lip and thus effectively to assist in guiding the sole and positively retaining it with the lip in proper transverse relation to the lip raising and turning instrumentalities.

Another object of the invention is to provide improved means for effectively and reliably operating upon a lipped sole after the lip has been preliminarily raised above the plane of the sole to turn the raised lip over toward the surface of the sole at the inner side of the lip.

To the accomplishment of this object the invention in another aspect resides in the combination, with means for feeding a lipped sole, of a lip turning tool constructed and arranged to move in the direction of feed of the lip at the point of engagement of the tool with the lip and to exert a combined longitudinal and transverse wiping action upon the lip. To this end as illustrated the tool is arranged with its axis parallel, or substantially so, to the axis of the lower feed roll and it is provided with a spiral rib for exerting the wiping action upon the lip. The tool shown herein has a periphery of a general conical or tapering form for engaging the lip in a path parallel to the line of engagement between the sole and the lower feed wheel. In order to provide for the above-described transverse wiping action upon the lip the periphery of the lip turning roll is grooved to form a double spiral rib which functions, as the tool rotates and the work is fed, to turn the lip by a wiping movement which progresses simultaneously widthwise and lengthwise of the lip.

Other objects of the invention and the features of construction by which they are obtained will be apparent from the following description taken in connection with the accompanying drawings, in which—

Referring to the drawings, the operating instrumentalities of the machine comprise a lower feed roll 12, an upper feed member or disk 14, a lip raising plow 16, a lip turning wheel 18, and a presser foot 20. The feed roll 12 and the feed disk 14 are arranged to engage the marginal portion of the sole at opposite sides of the feather and they cooperate to feed the sole so that the channel lip is presented progressively to the plow, the lip turning wheel and the presser foot, whereby said members are enabled to operate successively in the order named, respectively, to raise the lip, turn or lay it back against the surface of the sole and set it in its backwardly turned position. The sole is fed across stationary work supporting and guiding members 22 and 24 arranged to engage the lower face of the sole at points respectively in advance of and beyond the bite of the feed members to assist in positioning the sole laterally for the operation thereupon of the plow and the lip turning wheel, the member 24 serving also to support the sole against the pressure of the presser foot 20. An edge gage 26 (Fig. 8) is arranged to engage the edge of the feather to assist in guiding the sole and positioning it edgewise relatively to the operating instrumentalities as the sole is fed.

The above-mentioned operating instrumentalities are mounted upon a head 28 which is supported at a convenient height for the operator upon a column or standard 30 adapted to rest upon the floor. The upper feed roll or disk 14 is fixedly secured to the forward extremity of a hollow shaft 32 which is journaled in suitable bearings in the head 28 and as shown is inclined at a considerable angle to the horizontal, the feed disk being located at the upper end of the shaft. The lower feed roll 12 is fixed to the forward extremity of a shaft 34 which extends in parallel relation to the hollow shaft 32 and is journaled in bearing blocks 36 and 38 located respectively adjacent to the rear and forward extremities of the shaft. The parallel relation of the shafts 32 and 34 facilitates the provision of simple driving connections between said shafts.

Figures 3, 4, 5, 6:
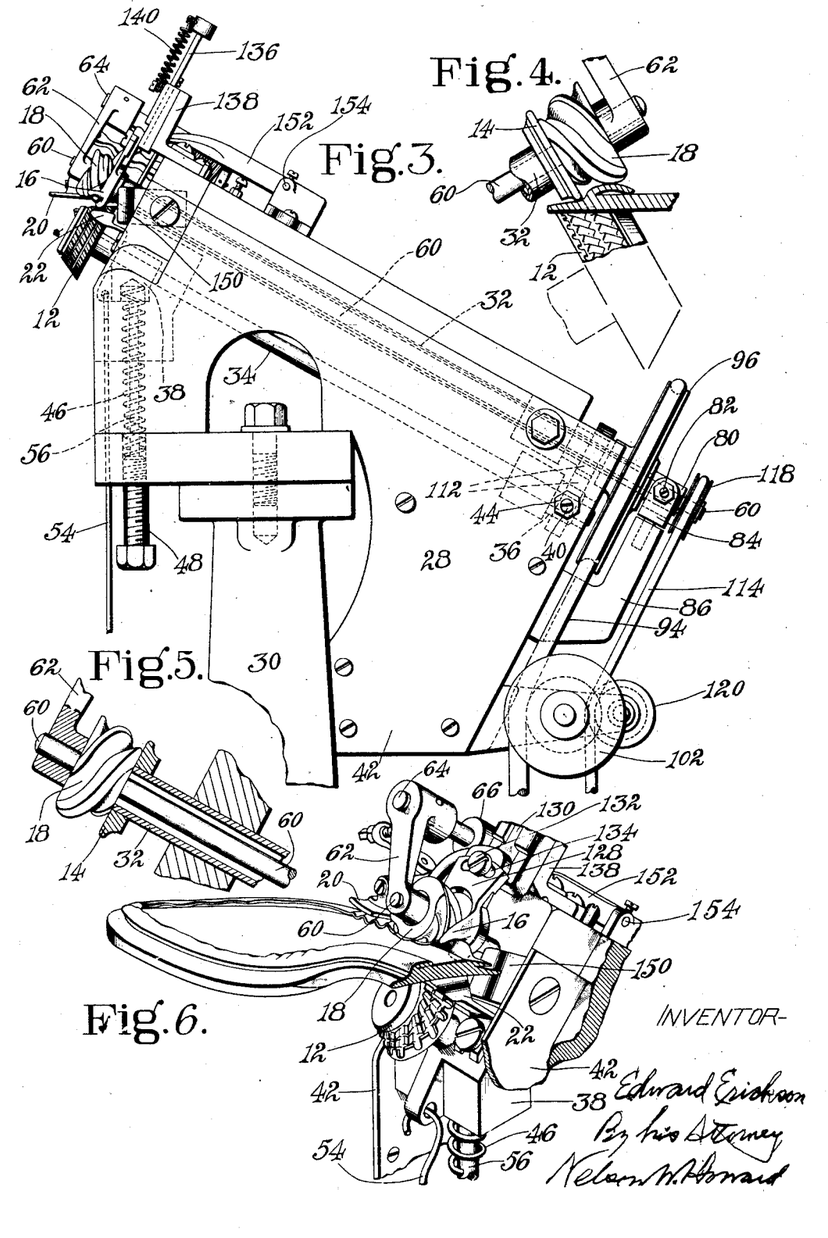
Fig. 3 is a side elevational view on an enlarged scale of the head of the machine.
Fig. 4 is a detail side elevational view of the feed rolls and the lip turning wheel showing their mode of operation upon the work.
Fig. 5 is a detail sectional view showing particularly the lip turning wheel and the upper feed roll and disclosing the manner in which they are mounted in operative relation to each other.
Fig. 6 is a perspective view of a portion of the head and showing also a sole which is being operated upon.

The bearing block 36 is mounted for a limited amount of swinging movement about a horizontal axis to enable the feed roll 12 to move toward and from the feed disk 14 to facilitate introduction and removal of the work and to accommodate variations in the thickness of the work. To this end the bearing block 36 is swiveled between the inner tapering ends of two axially alined pivot studs 40 (Fig. 3) in the form of screws which are threaded through vertical plates 42 constituting opposite sides of the head 28 and which are held in place by means of lock nuts 44 arranged to bear against the plates 42. The bearing blocks 38 are arranged for vertical sliding movement between the forward portions of the plates 42 and are yieldingly supported by means of a coil spring 46 the upper end of which is seated in a socket in the block 38. At its lower extremity the spring 46 bears against the upper end of a screw 48 which is threaded into a portion of the head 28 and is adapted to be turned to adjust the tension of the spring. The bearing block 38 is adapted to be depressed against the force of the spring 46 for the purpose of separating the feed members to permit the insertion or removal of the work by depression of a foot treadle 50 which is pivoted at 52 and is connected by means of a rod 54 with the bearing block 38. Downward movement of the feed roll 12 is limited by means of an adjustable stop 56 made in the form of a rod integral with the screw 48 and arranged to extend upwardly in the direction of the convolutions of the spring 46 for engagement with the bearing block 38. A suitable stop is provided, by notching the edge gage 26, as shown at 58 in Fig. 2, for limiting the upward movement of the feed roll 12 to prevent it from engaging the feed disk 14 when the work is removed from the machine.

The lip turning wheel 18 is fixed to the forward upper extremity of a shaft 60 which is contained within the hollow shaft 32 and which projects beyond both ends of the latter. At its forward extremity the shaft 60 is journaled in the lower end of an arm 62 carried by a rockshaft 64 which is mounted in a bearing 66 on the head of the machine. The rockshaft 64 extends rearwardly beyond the bearing 66 and is encircled by a coil spring 68 which tends to rotate the shaft 64 in a direction to urge the lip turning wheel 18 downwardly toward the feed roll 12. To this end, as shown, one extremity of the spring 68 bears against the side of the bearing 66 while the opposite end of the spring 68 is engaged with a pin 70 carried by a collar 72 fixed to the rockshaft 64 by means of a set screw 74. The downward movement of the arm 62 and lip turning wheel 18 is limited by an adjustable stop screw 76 which is carried by a fixed arm 78 and is arranged to engage the arm 62. The collar 72 is adapted to be turned upon the rockshaft to adjust the tension of the spring 68. At its rearward extremity the shaft 60 is journaled in a bearing block 80 which is mounted for a limited amount of universal movement. To this end, as shown, the bearing block 80 is swiveled upon axially alined pivot studs 82 carried by the arms of a yoke block 84 which, in turn, is swiveled upon a fixed bracket 86 for oscillation about an axis at right angles to the axes of the studs 82. There is sufficient play between the shaft 60 and the inner surface of the hollow shaft 32 to permit a limited amount of up-and-down movement of the lip turning wheel relatively to the feed wheels.

In order to adapt the lip turning wheel to turn the lip by a wiping action progressing both lengthwise and widthwise of the lip the periphery of said wheel is grooved or shaped to form double spiral ribs and the wheel is of generally conical or tapering form so that the transverse wiping action of the ribs shall proceed inwardly along a path parallel to the plane of that portion of the sole which is being operated upon, this plane being determined by the shape and position of the lower feed roll. The wiping ribs are of a smoothly rounded cross-section to insure against injury to the material operated upon. It has been found that the combined longitudinal and transverse wiping actions imparted to the lip by a tool of the above-described type are particularly effective for the purpose of turning the lip and flattening it against the face of the sole. The lip turning wheel is driven at such speed that the wiping strokes of the spiral ribs follow in rapid succession and effectively set the lip in its turned or flattened position.

Figures 7, 8, 9:
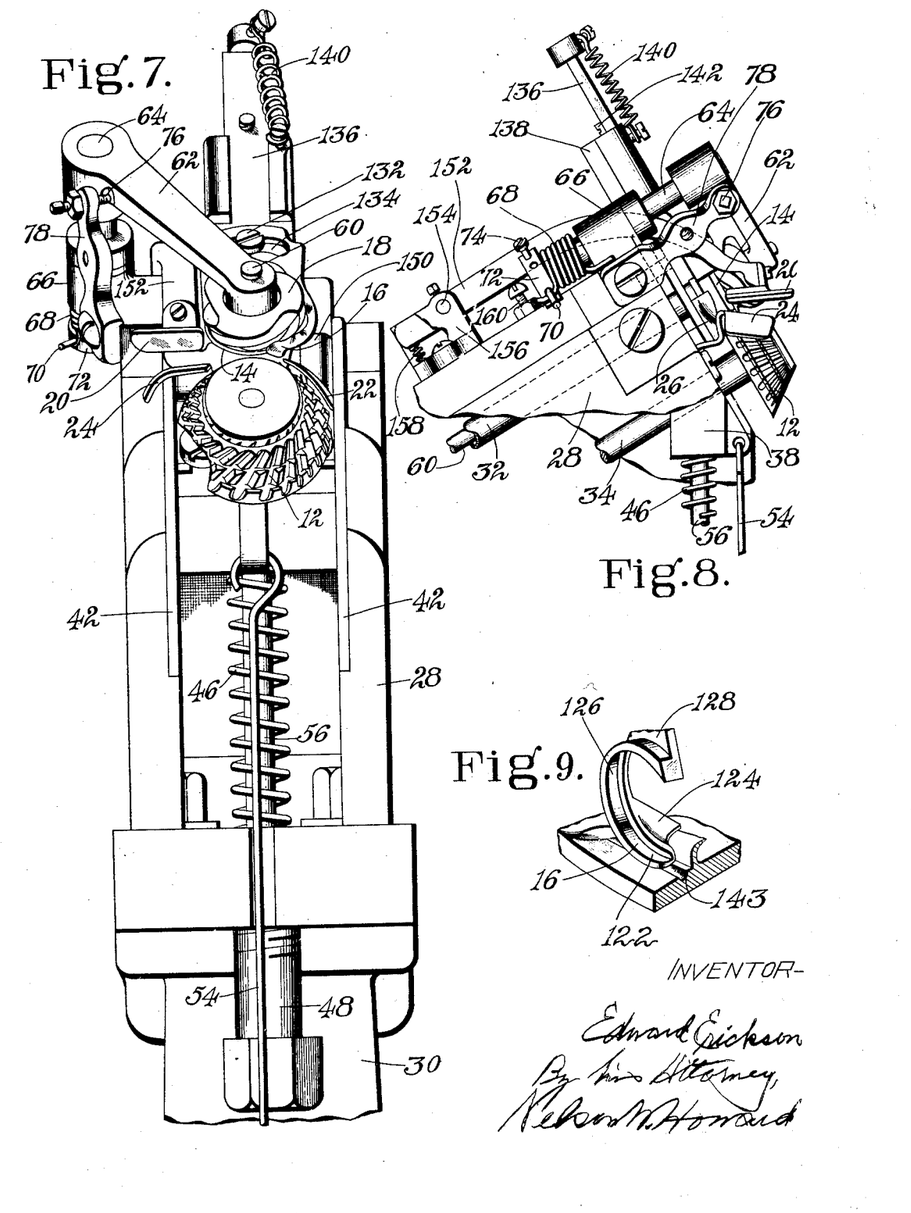
Fig. 7 is a front elevational view of the head of the machine.
Fig. 8 is a side elevational view of a portion of the head showing the opposite side from that shown in Figs. 1 and 3.
Fig. 9 is a perspective view of the lip raising plow showing it in operation upon the work.

The lower feed roll 12, as shown, is made of very small diameter to enable it to enter the sharp angle between the shank and forepart of a molded sole of the cottage-shank type and the periphery of said roll is beveled further to facilitate operations upon molded soles of this type and to avoid injury thereto particularly as the portion of the sole in the vicinity of the ball is being operated upon. The periphery of the roll is wide enough to support the sole not only substantially throughout the entire width of the feather but also for a substantial distance inwardly from the feather and the roll is roughened or toothed to provide for positive feeding engagement with the roll, the teeth being preferably inclined transversely with respect to the beveled periphery of the roll, as best shown in Fig. 7, so as to tend to impart a slight edgewise movement to the sole in a direction to crowd it against the edge gage. The outer edge portion of the lower feed roll assists in supporting the work against the thrust of the lip turning roll but inasmuch as it is offset considerably from the plane of the upper feed disk and would not assist materially in feeding the sole it is made smooth, as shown, instead of being toothed as is the rest of the periphery of the roll. The teeth of the roll 12, instead of being continuous across the width of the roll are formed, as shown, in three rows separated by narrow spaces which interrupt the continuity of the indentations produced upon the sole so that there is less danger of substantial injury to the surface of the sole although the sole is fed as positively as if the teeth were continuous. The angle of inclination of the axis of the lower feed roll is made such that the portion of the work which is being operated upon is supported in a substantially horizontal plane in which position it may be manipulated to best advantage while the progress of the lip turning operation may be conveniently watched by the operator.

The upper feed roll 14 is a relatively thin disk-like member which co-operates with the lower feed roll to grip and feed the sole. The periphery of the upper feed disk is transversely rounded or shaped to enter and ride along the stitch-receiving groove of a sole such as a McKay sole and thus tends to retain the sole against edgewise displacement so as to prevent it from riding out from between the feed rolls. The feed disk functions therefore, in connection with soles having a stitch-receiving groove, as an effective means for guiding the sole. If, however, the sole being operated upon has no stitch-receiving groove the upper feed disk is adapted to ride along the shoulder or base of the lip, in which event it supplements the action of the edge gage in guiding the sole. In many cases it may be found that the upper feed disk will perform its sole guiding function sufficiently well to render the employment of an edge gage unnecessary. The upper feed roll or disk 14 is located substantially opposite the middle portion of the periphery of the lower feed roll 12 and it has only a restricted area of feeding contact with the sole in the vicinity of the base of the lip. It will be plain therefore that the outer portion of the sole margin is not engaged by the feed rolls in such a manner as to cause the sole to be injured as it is swung. Consequently there is no danger of marring the surface of the sole margin at the unlipped side of the sole which is often exposed to the finished shoe. On account of the oblique relation of the upper feed disk 14 to the face of the sole and to the portion of the periphery of the lower feed roll which is in engagement with the sole, the disk is enabled to ride along the more or less sharply curved parts of the stitch-receiving groove or shoulder portions of the lip at the ball or at the toe of the sole without danger of injury to the stock and further the sole margin is gripped in such a manner as to offset any tendency of the sole to ride out from the bite of the feed rolls as would be likely to occur, particularly along a thin edge shank, if the upper feed disk were disposed in perpendicular relation to the sole.

The upper feed roll or disk 14 is driven from a motor 90 (Fig. 1) through speed reducing belt and pulley connections with the hollow feed disk shaft 32. The motor 90 is conveniently supported by a bracket 92 which extends rearwardly from the pedestal 30. The driving connections comprise a belt 94 which passes over a pulley 96, fixed upon the rear extremity of the upper feed roll shaft 32, and over a section 98 of a stepped pulley 100 which is mounted upon the lower portion of the pedestal 30. As shown idle rolls, such as 102, mounted upon the head 28, support the stretches of the belt between the pulleys 96 and 100 so as to adapt the belt to the relative angular disposition of said pulleys. The stepped pulley 100 is in turn driven by a belt 104 which passes over a section 106 of the pulley 100 and a pulley 108 secured to the shaft of the motor 90. A third section 110 is provided upon the pulley 100 to which the belt 94 may be shifted for the purpose of varying the ratio of speed reduction.

The lower feed roll 12 is driven from the upper feed roll shaft 32 at the same speed as the upper feed roll through the intermeshing gears 112, one on the shaft 32 and the other on the lower feed roll shaft 34. The lower gear 112 is secured to the shaft 34 in line with the axis about which said shaft is swung for the purpose of raising and lowering the lower feed wheel, thus insuring that such movement of said shaft will not interfere with the intermeshing relation of the gears 112.

The lip turning wheel 18 is driven from the motor 90 at comparatively high speed and in the same direction as the upper feed wheel by a belt 114 passing over a pulley 116 on the motor shaft and a pulley 118 on the lip turning wheel shaft 16. The belt 114 also passes over direction changing pulleys 120 arranged to direct the upper and lower stretches of the pulley in accordance with the angularly disposed planes of the pulleys 116 and 118. Inasmuch as the pulley 118 is located closely adjacent to the pivotal axis about which the shaft 60 swings, as the vertical position of the lip turning wheel varies, the resulting change of vertical and angular position of said pulley is so slight as not to interfere with the action of the driving belt 114.

Before reaching the lip turning wheel the lip is acted upon by the plow 16 which raises the lip and turns the free edge thereof somewhat inwardly from a vertical plane, as clearly shown in Fig. 9, in which condition the lip is advantageously presented to the field of operations of the lip turning wheel. For this purpose the plow 16 comprises a toe portion 122 (Fig. 9) adapted to ride in the channel and to bridge the stitch-receiving groove, and a horn 124 arranged to bend the free edge portion of the lip inwardly. In order that the lip shall be held in raised position when engaged by the lip turning wheel it is desirable that the operative portion of the plow 16 shall be located in close proximity to the point of engagement of the lip turning wheel with the lip. Such an arrangement of the plow is facilitated by forming the operative parts thereof at the lower end of a shank 126 which is curved to encircle the upper feed roll. The shank 126 terminates in a flat wing portion 128 which is secured to a carrier 130 by means of a screw 132 which extends through an arcuate slot 134 in the wing portion of the plow shank. The slot 134 is substantially concentric with the axis of the upper feed roll so that by loosening the screw 132 and adjusting the shank of the plow relatively to the carrier 130 the operative portions of the plow may be adjusted both vertically as well as toward and from the point of engagement of the lip turning wheel with the work.

To adapt the plow to variations in the thickness of the work the plow carrier 130 is mounted for vertical yielding movement and as shown is made in the form of a slide bar 136 mounted for up-and-down sliding movement in a guideway formed in a bracket 138 on the head of the machine. The slide bar 136 extends above the guideway in the bracket 138 and a spring 140 connecting the slide bar with the bracket 138 urges the slide bar, and consequently the plow, downwardly. Sufficient clearance is provided between the curved shank portion of the plow and the upper feed roll to permit upward yielding movement of the plow. A stop screw 142 carried by the slide bar 136 is adapted to engage the bracket 138 to limit the downward movement of the plow and prevent it from engaging the lower feed wheel when there is no work present in the machine.

Figures 1, 2:
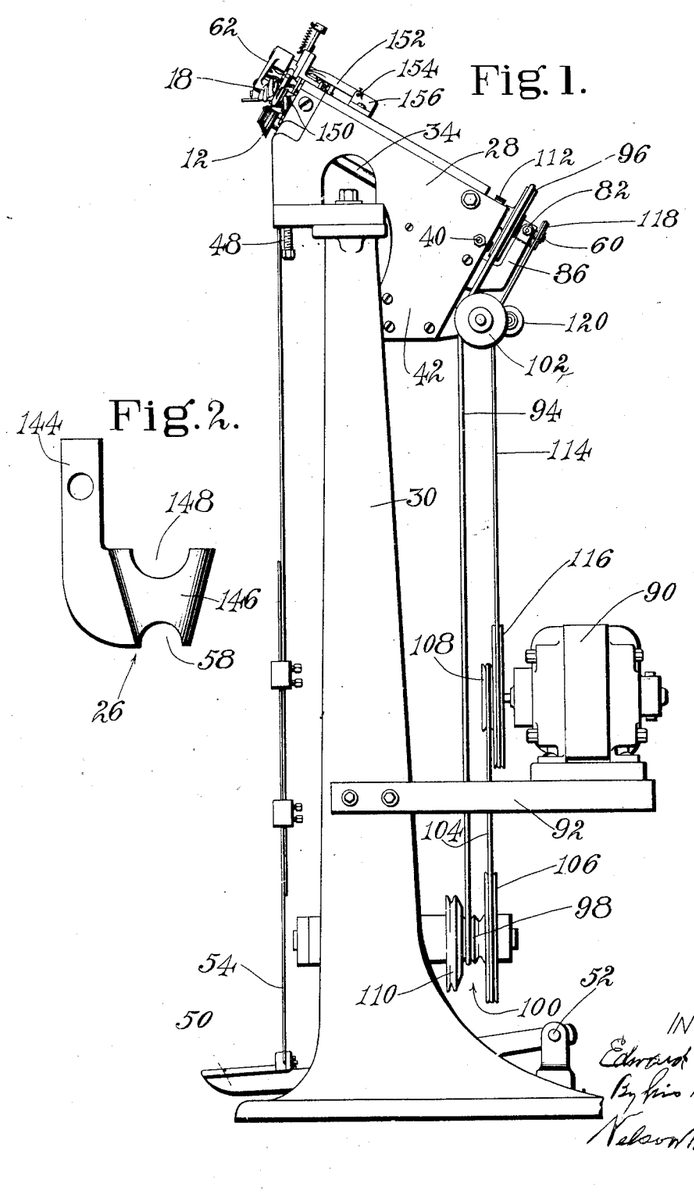
Fig. 1 is a view in side elevation of a machine constructed in accordance with the present invention.
Fig. 2 is a detail front elevational view of the edge gage.

When the sole which is to be operated upon is provided with a stitch-receiving groove beneath the channel lip, such as indicated at 143 in Fig. 9, the upper feed roll disk rides along this groove and serves to guide the sole and locate it edgewise relatively to the lip turning devices. To supplement this guiding action and to provide for proper guidance of the work when no stitch-receiving groove is formed in the sole the edge gage 26 is provided. As best shown in Fig. 2 the edge gage is formed with a shank portion 144 for attachment to the head of the machine and with a forwardly protruding convex portion 146 for engaging the edge of the sole. The rounded work-engaging portion 146 and the shank portion 144 are angularly disposed relatively to each other so that the shank may be secured to the inclined forward portion of the head while the operative part of the edge gage will be located in a vertical plane so that it will engage the sole throughout the width of the sole edge. The portion 146 is notched at 148 to avoid interference with the shaft of the upper feed disk.

In addition to the edge gage 26, an abutment 150 carried by the head is arranged in the plane of the sole to insure that the sole cannot be turned so sharply by the operative as to cause injury to the work as by the point of the plow digging into the shoulder or base of the lip.

The tables or work supports 22 and 24 are arranged to facilitate lip turning operations on flat soles and are removably secured to the movable bearing block 38 in which position they function in conjunction with the lower feed roll to sustain the sole. These supports 22 and 24 further serve to prevent the flat sole from being tilted by the operative either forwardly or backwardly in the direction of feed and thus insure that the portion of the work being operated upon shall at all times be maintained in a substantial horizontal plane so that it will be presented most advantageously for the lip raising and turning operations. The table 22 is curved about the periphery of the lower feed roll to facilitate the convenient introduction of the work into the machine and serves as a guard to prevent the operative's hands from being injured by the toothed surface of the feed wheel. The table 24 supports the portion of the sole which has been operated upon against the downward thrust of the presser foot 20.

The rests 22 and 24 are removably secured to the bearing block 38 by means of screws so that either or both may be removed from the machine preparatory to performing lip turning operations upon soles having cottage roof shanks. The abrupt bend at the junction of the shank and the forepart in soles of this type requires the sole to be tilted sharply as the bend in the margin is being fed past the lip turning wheel, and it is with a view to preventing any possible interference with the tilting movement that provision is made for removing the work supports 22, 24 which, when secured to the machine, lie in the line of feed of the sole margin.

The presser foot 20, as best shown in Fig. 8, is carried at the forward extremity of a curved lever 152 which is pivoted at 154 to a bracket 156 carried by the head 28. The presser foot is urged downwardly against the work by means of a spring 158 which is interposed between the portion of the bracket 156 and the rear extremity of the pressure foot lever 152. The downward movement of the presser foot is limited by means of an adjustable stop 160. The presser foot aids in setting the lip in its turned or flattened position and is particularly effective to retain the lip in puckered or pleated condition around the toe of the sole.

Having described my invention, what I claim as new and desire to secure by Letters Patent of the United States is:

1. In a machine of the class described, in combination, lip turning means, and means for feeding a lipped sole comprising a feed roll coaxial with the lip turning means and arranged to engage the lipped face of a sole outside of the lip and to bear against the shoulder of the lip, and a second feed roll rotatable about an axis parallel to the axis of the first roll arranged to engage the margin of the unlipped face of the sole.

2. In a machine of the class described, in combination, lip turning means, and means for feeding a lipped sole comprising a feed roll arranged to engage the lipped face of a sole outside of the lip and to bear against the shoulder of the lip, and a supporting roll rotatable about an axis parallel to the axis of the first roll and having a beveled peripheral face for engaging the margin of the unlipped face of the sole for a substantial distance inwardly from the sole edge.

3. In a machine of the class described, in combination, a lip turning tool, and means for feeding a lipped sole comprising a feed disk coaxial with the lip turning means and having a smooth periphery for engaging the material of a lipped sole at the base of the lip, and a toothed supporting roll rotatable about an axis parallel to the axis of the feed disk for engaging the unlipped face of the sole at a point outside the feed disk.

4. In a machine of the class described, in combination, lip turning means, and means for feeding a lipped sole comprising a feed roll arranged to engage the lipped face of a sole outside of the lip and to bear against the shoulder of the lip, and a second feed roll rotatable about an axis parallel to the axis of the first roll arranged to engage the margin of the unlipped face of the sole, said rolls being constructed and arranged to support the portion of the sole engaged thereby in a plane oblique to the axes of the rolls.

5. In a machine of the class described, in combination, lip turning means, a feed roll rotatable about an axis inclined to the horizontal, the roll being arranged to engage the lipped face of a sole outside of the lip and to bear against the shoulder of the lip, and a supporting roll having a beveled peripheral face for engaging the margin of the unlipped face of the sole for a substantial distance inwardly from the sole edge and having its axis parallel to the axis of the first roll.

6. In a machine of the class described, in combination, means for turning the lip of a sole over against the face of the sole, a feed member for engaging the lipped face of the sole outside of the lip, and a feed roll for engaging the unlipped face of the sole, said roll having a roughened peripheral portion for co-operating with said feed member to feed the sole and a smooth peripheral portion for supporting the sole against the thrust of the lip turning means.

7. In a machine of the class described, in combination, a lip turning tool, and means for feeding a lipped sole comprising a feed roll for engaging the lipped face of a sole outside of the lip, and a supporting roll rotatable about an axis parallel to the axis of the first roll and having a beveled peripheral face provided with work-engaging teeth which extend transversely across said face at an angle to axial planes intersecting the teeth.

8. In a machine of the class described, in combination, lip turning means, and means for feeding a lipped sole comprising a feed disk having a transversely rounded periphery shaped to ride in the stitch-receiving groove of an insole for a McKay sewed shoe, and a supporting roll rotatable about an axis parallel to that of the feed disk for engaging the ungrooved face of the sole.

9. In a machine for turning the lip of a channeled sole, in combination, a lip turning tool constructed and arranged to move in the direction of feed of the lip at the point of engagement of the tool with the lip and to exert a combined longitudinal and transverse wiping action upon the lip, and means for feeding the sole to transfer the field of operation of the tool lengthwise of the lip.

10. In a machine of the class described, a rotary lip turning tool having a working portion arranged to exert a wiping action transverse to the plane of rotation of the tool, and means for feeding the margin of a lipped sole past said tool in a direction transverse to the axis of the tool to enable the tool to operate progressively lengthwise of the lip.

11. In a machine of the class described, a rotary lip turning tool having a spiral rib formed thereon arranged to wipe across the lip of a lipped sole at each revolution of the tool, the work engaging portion of said rib being adapted to progress inwardly of the sole toward the free edge of the lip throughout its period of engagement with the lip, and means for feeding the sole margin past said tool in a direction transverse to the axis of the tool to enable the tool to operate progressively lengthwise of the lip.

12. In a machine of the class described, in combination, a lip turning roll having a peripheral rib disposed obliquely with respect to the axis of the roll, and means for feeding a lipped sole past said roll in a direction transverse to the axis of the roll to present the lip progressively to said tool.

13. In a machine of the class described, a rotary lip turning member having a tapered peripheral rib disposed obliquely with respect to the axis of said member, co-operating feed wheels arranged with their axes extending in the same direction as the axis of said member, and means for supporting a sole in a plane oblique to the axes of the feed wheels and lip turning member.

14. In a machine of the class described, a feed wheel arranged to engage one side of a lipped sole with its circumferential face, and a rotary lip turning tool arranged with its axis parallel to the axis of the feed wheel and having a peripheral portion arranged to exert a wiping action upon the lipped sole in a plane transverse to the direction of rotation of the tool.

15. In a machine of the class described, a feed wheel arranged to engage one side of a lipped sole with its circumferential face, a lip turning tool arranged with its axis parallel to the axis of the feed wheel and having a peripheral rib extending obliquely with respect to the axis of the roll for exerting a wiping action upon the lip of the sole in the direction of the axis of the roll.

16. In a machine of the class described, a feed wheel arranged to engage one side of a lipped sole with its circumferential face, means co-operating with the feed wheel to advance the marginal portion of the sole in a lengthwise direction, and a rotary lip turning tool arranged with its axis parallel to the axis of said wheel and having a periphery shaped to wipe transversely across the lip of the sole as the sole is fed.

17. In a machine of the class described, feed wheels rotatable about parallel axes arranged to engage opposite sides of a lipped sole with their circumferential faces, and a rotary lip turning tool arranged with its axis parallel to the axes of said rolls, and having a ribbed periphery shaped to wipe transversely across the lip of the sole as said tool rotates.

18. In a machine of the class described, a roll having spirally arranged ribs upon its circumferential face for engaging the lip of a lipped sole and turning the lip against the face of the sole, and means including a feed wheel arranged with its axis parallel to the axis of said roll for feeding the sole past said tool.

19. In a machine of the class described, a feed wheel arranged to engage the feather of a channeled sole with its circumferential face at a point adjacent to the base of the channel lip, and a rotary lip turning tool coaxial with the feed wheel and having a peripheral working portion arranged to exert a wiping action in a direction transverse to the plane of rotation of said tool.

20. In a machine of the class described, co-operating feed wheels arranged to engage opposite sides of the margin of a channeled sole with their circumferential faces, a lip turning roll coaxial with one of said wheels for turning the channel lip, and means for rotating the lip turning wheel at a different speed from that of the feed wheel with which it is coaxial.

21. In a machine of the class described, co-operating feed wheels adapted to engage opposite sides of a lipped sole and arranged with their axes parallel, and a rotary lip turning member coaxial with one of said wheels for turning the lip of the sole.

22. In a machine of the class described, co-operating feed wheels adapted to engage opposite sides of a lipped sole and arranged with their axes parallel, a rotary lip turning member coaxial with one of said wheels for turning the lip of the sole, means for driving the feed wheels at substantially the same surface speed, and means for rotating the lip turning wheel at a greater speed than that of the feed wheels.

23. In a machine of the class described, means for feeding a lipped sole including a feed wheel for engaging the margin at the lipped side of the sole, a lip turning roll coaxial with said feed wheel for turning the lip, and means for rotating said wheel and said roll in the same direction.

24. In a machine of the class described, a lip turning tool, a lower feed wheel for engaging the sole margin at the unlipped side of a lipped sole, and an upper feed wheel, arranged with its axis parallel to the axis of the lower feed wheel, for engaging the feather at the lipped side of the sole and co-operating with the lower feed wheel to feed the lip of the sole past said tool, the upper feed wheel having a relatively narrow transversely convex peripheral face having substantially only a single point of contact with the sole.

25. In a machine of the class described, a feed wheel for engaging the sole margin at the unlipped side of a lipped sole, and an upper feed wheel for engaging the feather at the lipped side of the sole and co-operating with the lower feed wheel to feed the lip of the sole, the upper feed wheel having its periphery transversely rounded and being arranged with its axis parallel to the axis of the lower feed wheel.

26. In a machine of the class described, means for feeding a channeled sole, a rotary lip turning tool arranged with its axis transverse to the direction of work feed, said tool having a working portion arranged to exert a wiping action transverse to the plane of rotation of the tool to turn the lip formed by the channel in the sole, and a plow for opening the channel to preliminarily raise the channel lip.

27. In a machine of the class described, a lip turning tool, means for feeding the margin of a lipped sole past said tool, a plow for raising the lip before it is acted upon by said tool, a member for supporting the portion of the sole being acted upon by the plow, a presser foot for holding the lip under pressure after it is acted upon by said tool and a second independent member for supporting the portion of the sole being acted upon by the presser foot.

28. In a machine for operating upon lipped soles, a series of members arranged for raising, turning, and pressing the lip of a sole, and a series of independently mounted tables co-operating respectively with said members, each table supporting the portion of the sole being operated upon by the member with which it co-operates.

29. In a machine for operating upon lipped soles, a series of members arranged for raising, turning, and setting in turned position the lip of a sole, each of said members being mounted for independent yielding movement to accommodate variations in the thickness of the margin of the sole being operated upon.

30. In a machine of the class described, feeding means arranged to engage the unlipped side of a lipped sole, a feed roll for engaging with its circumferential face, the lipped side of the sole and co-operating with said feeding means to feed the sole, and a lip turning tool substantially coaxial with said feed roll, the lip turning tool and the feed roll being mounted for yielding movements relatively to each other.

In testimony whereof I have signed my name.

EDWARD ERICKSON.